United States Patent [19]
Felesky

[11] Patent Number: 6,130,858
[45] Date of Patent: Oct. 10, 2000

[54] MULTIPURPOSE ULTRASONIC MOTION, POSITION SENSOR FOR INTERACTIVE DISPLAY OF PLAY OR EXERCISE

[76] Inventor: Art Felesky, 3240 Shelby Dr., Los Angeles, Calif. 90034

[21] Appl. No.: 09/158,332

[22] Filed: Sep. 21, 1998

[51] Int. Cl.[7] .................................................. G01S 15/00
[52] U.S. Cl. ............................................................ 367/116
[58] Field of Search .................................... 367/107, 116, 367/89, 99

[56] References Cited

U.S. PATENT DOCUMENTS 4,559,015  12/1985  Felesky .
5,979,239  11/1999  Youngquist et al. ..................... 73/584

Primary Examiner—Daniel T. Pihulic

[57] ABSTRACT

An ultrasonic sensor to monitor motion and position to provide interactive feedback to an individual during exercise or play. The sensor can measure distance and speed, count repetitions and calculate cumulative energy spent in an activity. The sensor has a display and an audio generator to provide interactive feedback to the individual. The sensor has a card port which can accept small program chips chosen by the user to add functions, enhancements or applications.

1 Claim, 1 Drawing Sheet

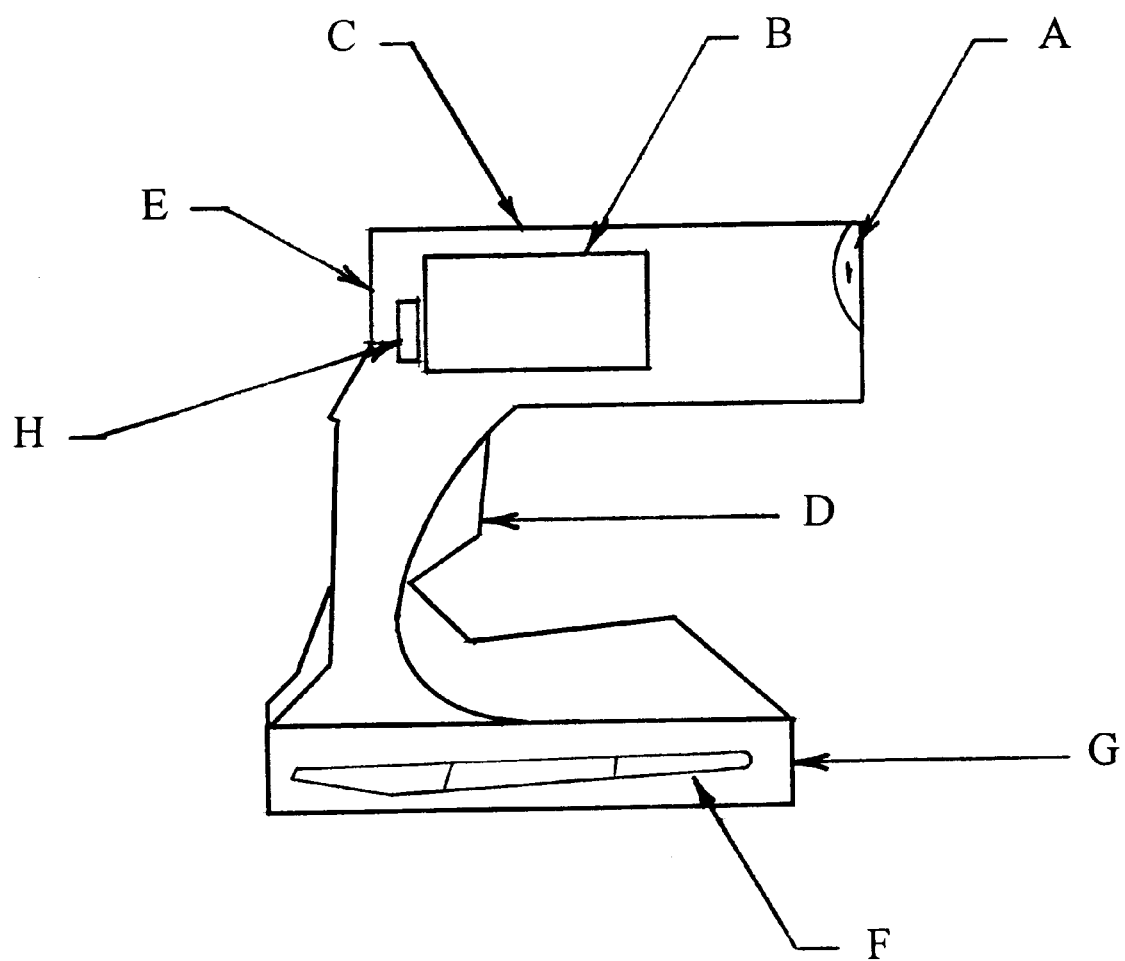

MULTIPURPOSE ULTRASONIC MOTION, POSITION SENSOR FOR INTERACTIVE DISPLAY OF PLAY OR EXERCISE

CROSS-REFERENCE TO RELATED APPLICATIONS

Previous U.S. Pat. No. 4,559,015 granted to Art Felesky, which discloses a method and means of testing and refining bicycle riding skills.

FIELD OF THE INVENTION

The present invention relates generally to ultrasonic ranging devices with circuitry for the detection of objects relative positions or speeds with respect to the device and for indicating a detection on a display or by generated sounds.

BACKGROUND OF THE INVENTION

There are ultrasonic system that detect obstacles in the path of automobiles or presence of intruders in to a monitored area.

SUMMARY OF THE INVENTION

The present invention describes an ultrasonic sensor that monitors and interacts with an individual's play, exercise or physical therapy.

The sensor can be used to monitor a bicycle rider to keep activity within a range of 1 to 30 feet in front of the sensor. The sensor can be used to monitor the speed of objects for example a 15 miles/hour safe speed limit could be used when monitoring a child. The sensor will detect objects crossing the area monitored by the sensor from 0 to 30 feet away therefore scoring or validation of a crossing event can be recorded with in tenths of a second. The sensor can also used at night in the dark. This sensor is like a computer game that responds to a child's or adult's environment inside or outside with other toys and activities such as bicycles, skate boarding, ball games, running and competitive games. This is different from other products that are versatile only by using them in specific environments limiting the experiences to a virtual activities instead of real life activities.

Another usage is to monitor exercise or physical therapy. An activity can be monitored by placing the sensor in the path of motion and inputting weight and body parameters. The motion can be counted and the range of motion, the relative effort or the cumulative energy spent in the activity can be calculated and displayed. The sensor could provide an activity report or generate specific sounds for any activity to assist the user to determine progress or timing of the activity. The sensor could be used or adapted to monitor any exercise machine by recording arm or leg movements and displaying a count of repetitions with sound feedback when the desired movement is completed successfully.

BRIEF DESCRIPTION OF THE DRAWING

The FIGURE is an illustration of the ultrasonic sensor of the present invention.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

Referring to the FIGURE an ultrasonic ranging sensor is described as follows. An ultrasonic transmitter/receiver element is placed in parabolic reflector (A) to aid in receiving reflected sound waves for longer distances than for an element without a parabolic reflector. The sensor includes a display and computing unit (B). The computer controls the transmission of the ultrasonic pulses and the detection of received reflections. The sensor includes keypad for information input and selecting an activity. The activities may be presented to the operator in a menu and relevant parameters such as counting, checking distance, speed, or calculating energy used by movement by selecting a weight and motion and letting the unit calculate the results. The display may also have overlay sheets to aid in monitoring an activity's information or scoring. The sensor includes an audio output (C) to produce sounds to indicate progress or counting. The sensor includes a handle with a trigger actuator (D) that the operator holds to cause activation of the ultrasonic transmissions and the selected activity's functions. The sensor includes a switch (E) to turn the sensor on, off or continuous operation for events that permit the operator to set the sensor in a position such that hands off use is allowed enabling a single operator to play or exercise and still record events, the sensor includes batteries (F) for operation and are placed in the unit in a balanced arrangement. The figure illustrates the orientation of 6 c-cell batteries oriented along the side of the base (G). The sensor is self standing due to the base. The sensor has a card port (H) which can accept small program chips chosen by the user to add functions, enhancements or applications that appear on the display.

I claim:

1. An ultrasonic activity sensor comprising:
   a parabolic reflector to aid in receiving reflected sound waves,
   an ultrasonic transmitter/receiver element placed in the parabolic reflector,
   a display and computing unit that controls transmission of ultrasonic pulses and detection of received reflections,
   a keypad for information input and selecting an activity and relevant parameters the activities may be presented to an operator in a menu,
   overlay sheets to aid in monitoring an activity's information or scoring,
   an audio output to produce sounds to indicate progress or counting, a handle,
   a trigger actuator that an operator holds to cause activation of the ultrasonic transmissions and the selected activity's functions,
   a switch to turn the sensor on, off or continuous operation for events that permit the operator to set the sensor in a position for hands off use,
   a base that allows the sensor to be self standing,
   batteries that are placed in the base, and
   a card port which can accept small program chips chosen by the operator to add functions, enhancements or applications to the sensor.

* * * * *